United States Patent
Yun et al.

(10) Patent No.: US 7,855,947 B2
(45) Date of Patent: Dec. 21, 2010

(54) METHOD FOR TRANSMITTING PILOT FOR MULTIPLE CARRIER SYSTEM

(75) Inventors: Young Woo Yun, Seoul (KR); Hak Seong Kim, Seoul (KR); Bong Hoe Kim, Gyeonggi-do (KR); Joon Kui Ahn, Seoul (KR); Dong Youn Seo, Seoul (KR); Jung Hoon Lee, Seoul (KR); Ki Jun Kim, Seoul (KR); Suk Hyon Yoon, Seoul (KR); Eun Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/509,307

(22) Filed: Jul. 24, 2009

(65) Prior Publication Data
US 2009/0290653 A1 Nov. 26, 2009

Related U.S. Application Data

(63) Continuation of application No. 12/278,564, filed as application No. PCT/KR2007/000656 on Feb. 7, 2007.

(60) Provisional application No. 60/771,226, filed on Feb. 7, 2006, provisional application No. 60/783,675, filed on Mar. 16, 2006.

(30) Foreign Application Priority Data

May 25, 2006 (KR) ............... 10-2006-0047151

(51) Int. Cl.
*H04J 11/00* (2009.01)
(52) U.S. Cl. .................................. 370/207
(58) Field of Classification Search .............. None
See application file for complete search history.

(56) References Cited

U.S. PATENT DOCUMENTS

| 7,298,722 | B2 | 11/2007 | Sudo |
| 7,391,750 | B2 | 6/2008 | Kim et al. |
| 7,515,924 | B2 * | 4/2009 | Nanda et al. ............. 455/522 |
| 7,539,157 | B2 * | 5/2009 | Ohsuge .................. 370/328 |
| 7,630,692 | B2 * | 12/2009 | Itoh et al. ................. 455/69 |
| 2005/0002358 | A1 * | 1/2005 | Miyoshi et al. ........... 370/332 |
| 2005/0084035 | A1 * | 4/2005 | Kim et al. ................ 375/295 |

(Continued)

FOREIGN PATENT DOCUMENTS

JP 11-355242 12/1999

(Continued)

*Primary Examiner*—Anh-Vu Ly
(74) *Attorney, Agent, or Firm*—McKenna Long & Aldridge LLP

(57) ABSTRACT

A method of transmitting pilot signals in a system which performs communication using two or more earners comprises transmitting first pilots and second pilots from at least one user equipment to a base station, the first and second pilots, which are transmitted from the at least one user equipment, being multiplexed by code division multiplexing, and the first and second pilots, which are transmitted from a specific user equipment, having different transmission powers, and transmitting data from the at least one user equipment to the base station depending on the first pilots and the second pilots. Since many UEs can transmit CQ pilots, exact channel estimation can be performed and thus communication efficiency can be improved.

7 Claims, 9 Drawing Sheets

U.S. PATENT DOCUMENTS

| | | |
|---|---|---|
| 2005/0201474 A1 | 9/2005 | Cho et al. |
| 2006/0018336 A1 | 1/2006 | Sutivong et al. |
| 2007/0014272 A1 | 1/2007 | Palanki et al. |
| 2007/0040703 A1* | 2/2007 | Akkarakaran et al. ....... 375/344 |
| 2007/0070944 A1* | 3/2007 | Rinne et al. ................. 370/329 |
| 2008/0112495 A1* | 5/2008 | Gore et al. .................. 375/260 |
| 2008/0285670 A1* | 11/2008 | Walton et al. ............... 370/338 |

FOREIGN PATENT DOCUMENTS

| | | |
|---|---|---|
| KR | 10-2004-0028490 | 4/2004 |
| KR | 10-2005-0087947 | 9/2005 |

\* cited by examiner

Pilot #1    Pilot #2    Pilot #3    Pilot #4

Pilot signals of UE 0

METHOD FOR TRANSMITTING PILOT FOR MULTIPLE CARRIER SYSTEM

This application claims the benefit of, and is a continuation of, U.S. application Ser. No. 12/278,564, filed Aug. 6, 2008, which is a national stage entry of International Application Number PCT/KR2007/000656, filed Feb. 7, 2007, and claims priority to U.S. Provisional Application Ser. Nos. 60/771,226, filed Feb. 7, 2006 and 60/783,675, filed Mar. 16, 2006, and Korean Patent Application Number 10-2006-0047151, filed in the Republic of Korea on May 25, 2006, and each of the above-identified applications is incorporated by reference herein in its entirety.

TECHNICAL FIELD

The present invention relates to a multiple carrier system, and more particularly, to a method of transmitting a pilot for a multiple carrier system.

BACKGROUND ART

Examples of a communication system using multiple carriers include an orthogonal frequency division multiplexing (OFDM) system and a DFT spreading OFDM (DFT-S-OFDM) system.

The basic principle of the OFDM system is to divide a data stream having a high transmission rate into a plurality of data streams having a slow transmission rate and simultaneously transmit the data streams using a plurality of carriers. Each of the plurality of carriers is referred to as a subcarrier. Since orthogonality exists between the plurality of carriers of the OFDM system, a receiver can detect frequency components of the carriers even if the respective frequency components are overlapped with each other. The data stream having a high transmission rate is converted into a plurality of data streams having a low transmission rate through a serial to parallel converter, the converted data streams are multiplied by each of the subcarriers, and the respective data streams are added to each other, whereby the resultant data streams are transmitted to the receiver.

The plurality of parallel data streams generated by the serial to parallel converter can be transmitted using a plurality of subcarriers by inverse discrete fourier transform (IDFT). The IDFT can be realized efficiently using inverse fast fourier transform (IFFT).

Since a symbol duration of subcarriers having a low transmission rate increases, temporally relative signal dispersion generated by multi-path delay spread is reduced. Meanwhile, a guard interval longer than delay spread of a channel may be inserted between OFDM symbols to reduce inter-symbol interference. Also, if a part of an OFDM signal is copied in the guard interval and then arranged at a start part of the symbol, the OFDM symbols are cyclically extended to be guarded.

A DFT-S-OFDM system (or single carrier-FDMA (SC-FDMA)) will be described below. The SC-FDMA system is mainly applied to an uplink, and applies spreading using a DFT matrix in a frequency domain before generating an OFDM signal and modulates the spreading result in an OFDM system according to the related art.

FIG. 1 is a schematic view illustrating an example of a DFT-S-OFDM transmitter. As shown in FIG. 1, an input data symbol is converted into a parallel signal by a serial to parallel converter 110 and then input to a DFT spread module 120.

The SC-FDMA system disperses the data symbol 's' using a DFT matrix before transmitting it. This can be expressed by the equation 1.

$$x = F_{N_b \times N_b} s \qquad \text{[Equation 1]}$$

In the equation 1, $F_{N_b \times N_b}$ is a DFT matrix having a size of $N_b$, which is used to disperse the data symbol 's.' Subcarrier mapping is performed for a vector 'x' by a constant subcarrier allocation mode, wherein the vector 'x' is obtained by dispersing the data symbol. The mapped vector is converted into a time domain signal by an IDFT module to obtain a signal to be transmitted to the receiver.

The signal to be transmitted to the receiver can be expressed by the following equation 2.

$$y = F_{N \times N}^{-1} x \qquad \text{[Equation 2]}$$

In the equation 1 and the equation 2, N represents the number of subcarriers which transmit an OFDM signal, $N_b$ represents the number of subcarriers for a random user, F represents a DFT matrix, 's' represents a data symbol vector 'x' represents a vector which data are dispersed in a frequency domain, and 'y' represents an OFDM symbol vector transmitted in a time domain.

In the equation 2, $F_{N \times N}^{-1}$ is a DFT matrix having a size of N, which is used to convert a signal of a frequency domain into a signal of a time domain. A signal 'y' generated as above is cyclically prefixed and then transmitted. A method of generating a transmission signal as above and transmitting the generated transmission signal to a receiver is referred to as an SC-FDMA method. The size of the DFT matrix can variously be controlled for a specific purpose.

Hereinafter, an orthogonal frequency division multiple access (OFDMA) system which is an example of a multiple access system will be described below. The OFDMA system realizes multiple access by providing a part of available subcarriers to each user in a modulation system which uses a plurality of orthogonal subcarriers. The OFDMA system provides frequency resources such as subcarriers to each user, wherein each of the frequency resources is independently provided to a plurality of users so as not to cause any overlap.

One of those necessarily required for data transmission in an uplink is pilot transmission. Pilot signals can be classified into two types depending on purpose of use. One of the two types corresponds to channel quality (CQ) pilots for measuring channel quality to perform user equipment (UE) scheduling and adaptive modulation and coding (AMC). The other of the two types corresponds to pilots for channel estimation and data modulation during data transmission. The CQ pilots are transmitted at a previously determined time in a frequency domain. A base station (Node B) identifies channel status of the UE by using the CQ pilots, and performs UE scheduling using the channel status information depending on a given scheduling mode. Accordingly, a plurality of orthogonal channels are required for uplink scheduling of the Node B at a limited time in a frequency domain so that a plurality of UEs within a cell transmit the CQ pilots. As a method of generating orthogonal channels for transmission of CQ pilots, time division multiplexing (TDM), frequency division multiplexing (FDM), code division multiplexing (CDM) or their combined multiplexing can be considered.

Meanwhile, the pilots for channel estimation and data demodulation during data transmission are data pilots transmitted in a specific frequency domain when the UE is scheduled at a specific time in the specific frequency domain and transmits data.

For example, in 3GPP LTE which is one of the standard for mobile communication, sub-frame which is a basic unit of transmission includes one or more pilot transmission blocks for pilot transmission. Since a block to which pilots are transmitted is smaller than or equal to a block to which data are transmitted, a block for pilot transmission will be referred to as a short block (SB). Meanwhile, if one sub-frame has two short blocks, the short blocks will be referred to as SB1 and SB2, respectively.

For scheduling of a frequency domain or high speed scheduling and AMC of sub-frame or its equivalent unit, orthogonal channels are required so that much more UEs transmit pilots. Accordingly, a method of transmitting pilots from the most possible UEs using limited frequency and time resources is required.

For example, in the case that orthogonal channels are simply formed within one sub-frame by time division multiplexing, a peak to average power ratio (PAPR) increases, thereby decreasing an advantage of SC-FDMA in an uplink. Also, even if orthogonal channels are formed by frequency division multiplexing to provide lots of UEs, the number of available UEs is limited due to limited frequency resources.

In the case that orthogonal channels are formed by code division multiplexing, lots of orthogonal codes can be allocated to lots of UEs by use of such lots of orthogonal codes. However, transmission power should be lowered, and if time latency of UE is greater than a certain time period, orthogonality between codes is removed and interference with another UE may be caused.

Meanwhile, since a UE which transmits data should transmit the pilots for channel estimation and data modulation to the base station, a method of properly multiplexing different kinds of pilots from a plurality of UEs and transmitting them is required.

DISCLOSURE OF THE INVENTION

Accordingly, the present invention is directed to a method of transmitting a pilot for a multiple carrier system, which substantially obviates one or more problems due to limitations and disadvantages of the related art.

An object of the present invention is to provide a method of transmitting a pilot for a multiple carrier system, in which pilot signals are multiplexed and then transmitted to efficiently perform communication.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting pilot signals in a system which performs communication using two or more carriers comprises transmitting first pilots and second pilots from at least one user equipment to a base station, the first and second pilots, which are transmitted from the at least one user equipment, being multiplexed by code division multiplexing, and the first and second pilots, which are transmitted from a specific user equipment, having different transmission powers, and transmitting data from the at least one user equipment to the base station in accordance with the first pilots and the second pilots.

In another aspect of the present invention, a method of transmitting pilot signals in a system which performs communication using two or more carriers comprises transmitting first pilots and second pilots from at least one user equipment to a base station, the first and second pilots, which are transmitted from the at least one user equipment, being multiplexed by frequency division multiplexing, and the first and second pilots on a frequency axis by the frequency division multiplexing having different arrangement intervals, and transmitting data from the at least one user equipment to the base station in accordance with the first pilots and the second pilots.

In another aspect of the present invention, a method of transmitting pilot signals in a system which performs communication using two or more carriers comprises transmitting first pilots and second pilots from at least one user equipment to a base station, the first and second pilots, which are transmitted from the at least one user equipment, being multiplexed by frequency division multiplexing and being multiplexed by allocated codes within each frequency, and transmitting data from the at least one user equipment to the base station in accordance with the first pilots and the second pilots.

In another aspect of the present invention, a method of transmitting pilot signals in a system which performs communication using two or more carriers comprises transmitting first pilots and second pilots from at least one user equipment to a base station, the first and second pilots, which are transmitted from the at least one user equipment, being transmitted using period and offset based on a certain time period, and transmitting data from the at least one user equipment to the base station in accordance with the first pilots and the second pilots.

In another aspect of the present invention, a method of transmitting pilot signals in a system which performs communication using two or more carriers comprises transmitting first pilots and second pilots from two or more user equipments to a base station using at least one transmission block included in one sub-frame, and if the two or more user equipments transmit the first pilots within one sub-frame, allocating a radio resource for transmission of the pilots in accordance with a transmission timing point of the pilots, and transmitting data to the base station in accordance with the first pilots and the second pilots using the allocated radio resource.

BEST MODE FOR CARRYING OUT THE INVENTION

Figure 1:
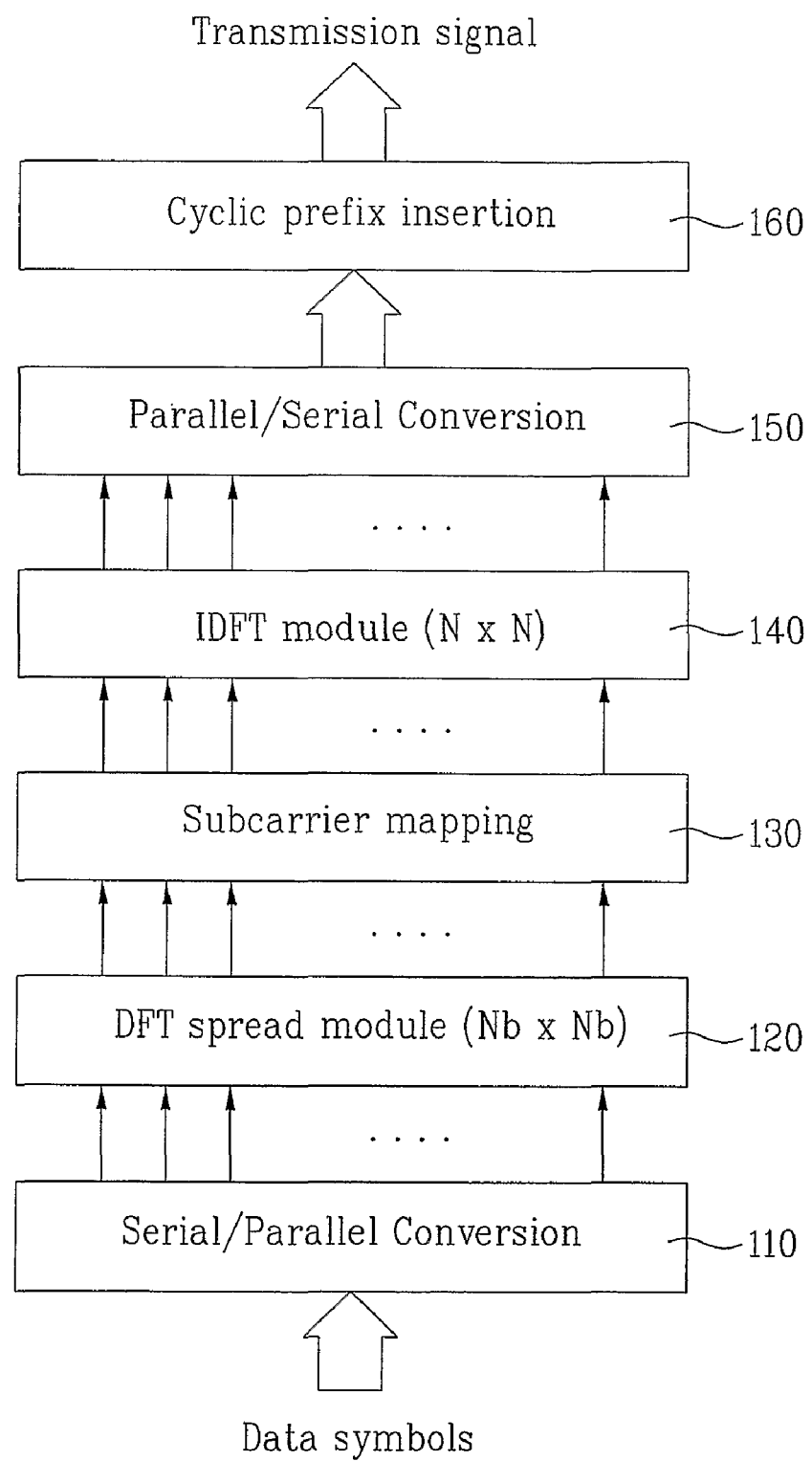
FIG. 1 is a schematic view illustrating an example of a DFT-S-OFDM receiver.

The aforementioned objects, features and advantages will be apparent to those skilled in the art through the following detailed description related to the accompanying drawings. Hereinafter, reference will now be made in detail to the preferred embodiments of the present invention, examples of which are illustrated in the accompanying drawings.

The present invention can be applied to a system which transmits data using a plurality of carriers, for example, an OFDM system, a DFT-S-OFDM system, and an OFDMA system. In this case, the plurality of carriers preferably have mutual orthogonality.

In the preferred embodiment of the present invention, an uplink of a system which transmits signals using a plurality of subcarriers transmits data pilots and CQ pilot signals in a multiplexing mode. Pilot signals of several UEs should be transmitted with mutual orthogonality within a block to which pilots should be transmitted. Examples of a multiplexing mode which allows pilot signals of UEs to have orthogonality include a code division multiplexing mode, a frequency division multiplexing mode, a time division multiplexing mode, and a combined multiplexing mode of the above three modes.

Examples of a system for multiplexing data pilots and CQ pilot signals will be described below. The examples which will be described below are related to the case where one sub-frame includes two short blocks (SBs), i.e., SB1 and SB2 for pilot transmission. Also, these examples will be applied to the case where one sub-frame includes a single long block (LB) for pilot transmission.

According to the first example of the system for multiplexing data pilots and CQ pilot signals, the CQ pilot signals are transmitted to SB1, and the data pilots are transmitted to SB2. According to the second example of the system for multiplexing data pilots and CQ pilot signals, the data pilots are transmitted to SB1, and the CQ pilot signals are transmitted to SB2. According to the third example of the system for multiplexing data pilots and CQ pilot signals, the data pilots are transmitted to SB1, and the data pilots and the CQ pilot signals are together transmitted to SB2. According to the fourth example of the system for multiplexing data pilots and CQ pilot signals, the data pilots and the CQ pilots are together transmitted to SB1, and the data pilots are transmitted to SB2. According to the fifth example of the system for multiplexing data pilots and CQ pilot signals, the data pilots and the CQ pilots are together transmitted to SB1, and the data pilots and the CQ pilot signals are also transmitted to SB2.

According to the first example and the second example, the data pilots are limited to one SB, and the CQ pilots transmitted from a plurality of UEs are multiplexed and transmitted to the other SB. In this case, since one of the two SBs is only used for transmission of CQ pilots, lots of UEs can transmit the CQ pilots.

However, in the case that the data pilots transmitted for channel estimation and data demodulation to exactly perform channel estimation during data transmission are not sufficient for only one of the two SBs, one SB is only used for data pilots and the other SB is used for data pilots and CQ pilots in the same manner as the third example and the fourth example. In this case, channel response is measured for SB1 and SB2 under the quickly variable channel environment to perform interpolation, thereby improving performance of channel estimation. However, since a radio resource that can transmit the CQ pilots is reduced, the number of UEs which transmit the CQ pilots is reduced. Meanwhile, according to the fifth example, since the data pilots are transmitted to a part of SB1 and SB2 and the CQ pilots are transmitted to the other part of SB1 and SB2, it is possible to efficiently adapt to the quickly variable channel environment while preventing the radio resource that can transmit the CQ pilots from being reduced.

Figure 2:
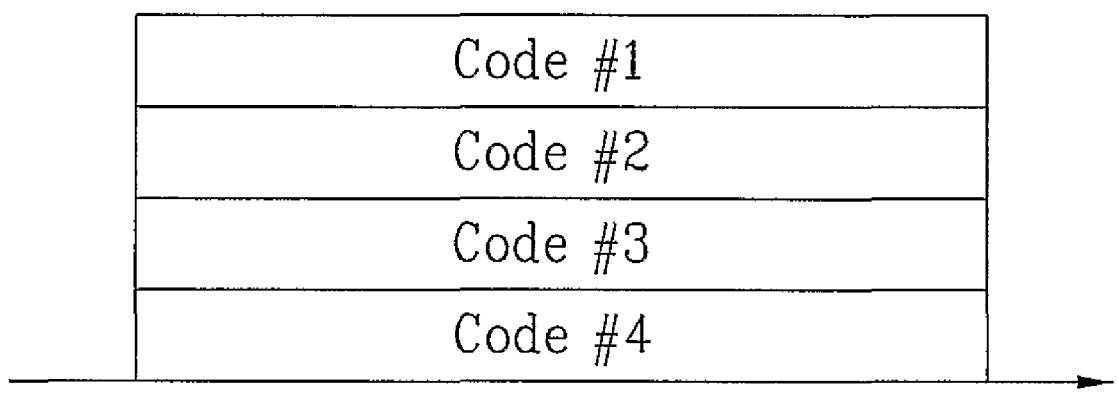
FIG. 2 is an explanatory view illustrating a method of transmitting pilot signals using code division multiplexing.

FIG. 2 is an explanatory view illustrating a method of transmitting pilot signals using code division multiplexing. Referring to FIG. 2, the method of transmitting pilot signals using code division multiplexing is to identify signals between respective UEs by giving different codes to the respective UEs in a time or frequency domain. In this case, the codes given to the UEs require mutual orthogonality, so that each UE signal can be identified without interference between the different UEs.

If the number of UEs which transmit pilots in a block for pilot transmission increases, transmission power should be lowered to reduce interference between adjacent cells, which is generated by system load. In other words, CQ pilot transmission power of UE is set to become small as the number of UEs which transmit pilots increases. Since the number of UEs which transmit CQ pilots to a frequency domain at a certain time period may be different from the number of UEs which transmit data pilots to the same frequency domain as that of the CQ pilots at the same time period as that of the CQ pilots, the transmission power of the CQ pilots and the transmission power of the data pilots may be set differently for the same UE. At this time, since the number of UEs which transmit data pilots to an uplink is greater than the number of UEs which transmit CQ pilots to the uplink at the same time, the transmission power of the CQ pilots is preferably set to be lower than that of the data pilots.

Even though the used codes have mutual orthogonality, orthogonality between the codes may not be maintained if the transmission power per UE is too small as too many UEs transmit pilots simultaneously, if time latency is too long, or if other factors occur. Accordingly, to obtain orthogonality of pilot signals using code division, the receiver applies an interference cancellation method so that many UEs can transmit pilots simultaneously.

FIG. 3A to FIG. 3D are explanatory views illustrating a method of transmitting pilot signals using frequency division multiplexing. As shown in FIG. 3, the frequency division multiplexing system identifies UEs, which transmit pilot signals in a time-frequency domain, using frequency. In other words, different UEs transmit pilot signals to different subcarriers.

Figure 3A:
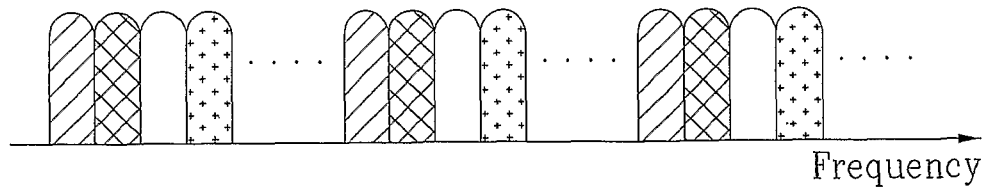
FIG. 3A to FIG. 3D are explanatory views illustrating a method of transmitting pilot signals using frequency division multiplexing.
Figure 3B:
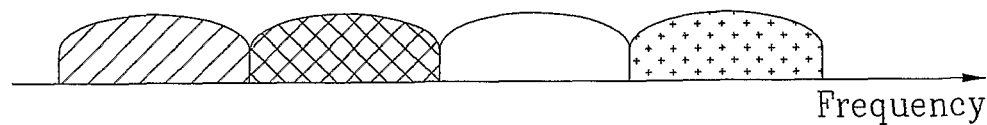

FIG. 3A is an explanatory view illustrating a distributed FDMA (D-FDMA) system. FIG. 3B is an explanatory view illustrating a localized FDMA (L-FDMA) system. When pilots are transmitted on a frequency axis, examples of a system of identifying signals of different UEs and allocating a frequency band to the UEs include a D-FDMA system shown in FIG. 3A and an L-FDMA system shown in FIG. 3B.

As shown in FIG. 3A, in a D-FDMA type frequency division multiplexing pilot transmission system, pilot signals transmitted from one UE are distributed at constant intervals in a frequency band which transmits pilots. Since CQ pilots of one UE are transmitted to the whole frequency band at constant intervals, frequency scheduling can easily be performed.

Figure 3C:
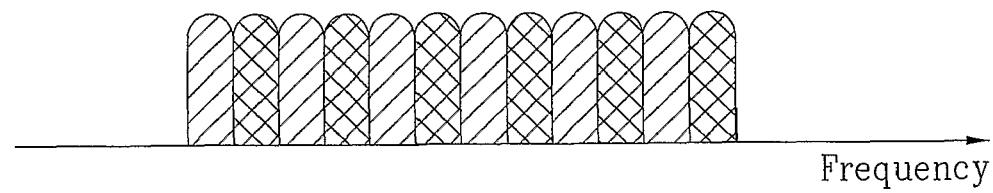
Figure 3D:
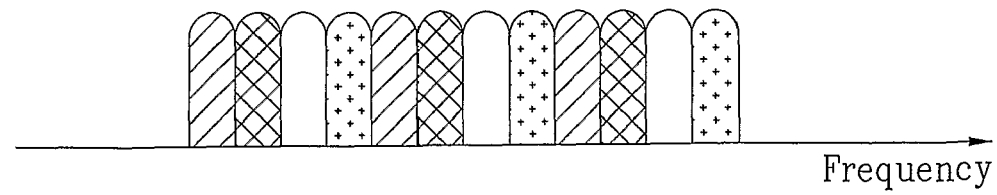
Figure 3D:
Figure 3D:
Figure 3D:
Figure 3D:

FIG. 3C and FIG. 3D are explanatory views illustrating a frequency interval according to the number of UEs which transmit pilots, in frequency division multiplexing. As shown in FIG. 3C and FIG. 3D, if the number of UEs which transmit pilot signals simultaneously increases, the frequency interval of the pilot signals of one UE increases. In other words, as shown in FIG. 3A, when the number of UEs which transmit pilot signals at one time is 2, pilot signals of each UE are disposed on the frequency at an interval of 2. However, as shown in FIG. 3B, when the number of UEs which transmit pilot signals simultaneously is 4, pilot signals of each UE are disposed on the frequency at an interval of 4.

To simultaneously support much more UEs using frequency division multiplexing, the interval of pilot signals of the UE becomes large. Accordingly, since the number of UEs which transmit CQ pilots simultaneously may be different from the number of UEs which transmit data pilots simultaneously, an arrangement interval of the CQ pilots and an arrangement interval of the data pilots may be set, in a frequency domain, differently from each other for the same UE. In this case, since the number of UEs which transmit CQ pilots to an uplink simultaneously is generally greater than the number of UEs which transmits data pilots to an uplink simultaneously, the arrangement interval of the CQ pilots in the frequency domain may be set greater than that of the data pilots.

As shown in FIG. 3B, in an L-FDMA type frequency division multiplexing pilot transmission system, one UE is assigned with a frequency band of a certain block to transmit pilots. In this case, since only CQ pilots for a local band can be transmitted, channel property for the whole frequency band cannot be obtained.

Figure 4A:
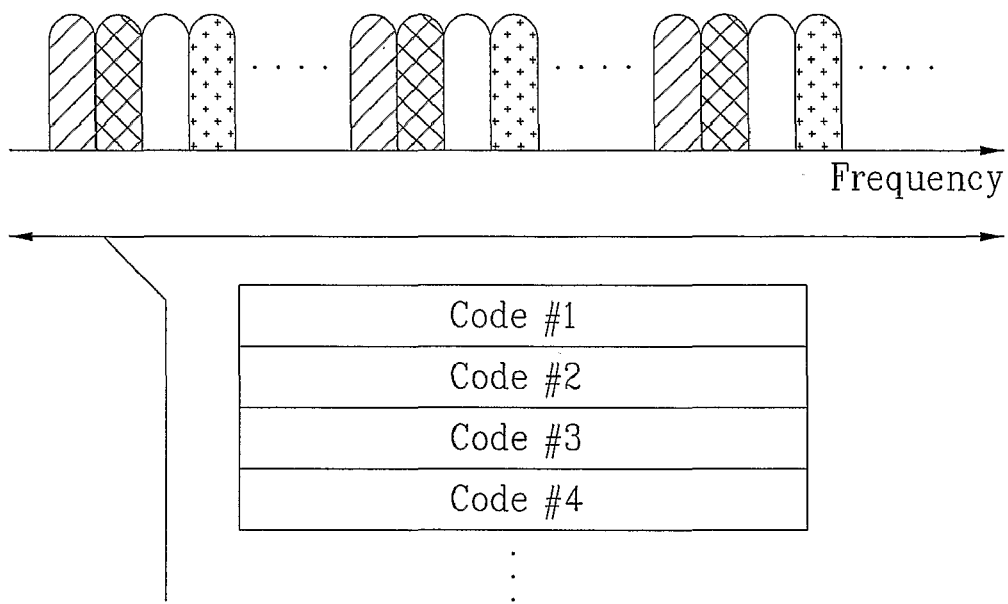
FIG. 4A and FIG. 4B are explanatory views illustrating a method of transmitting pilot signals using combined multiplexing of code division multiplexing and frequency division multiplexing.
Figure 4B:
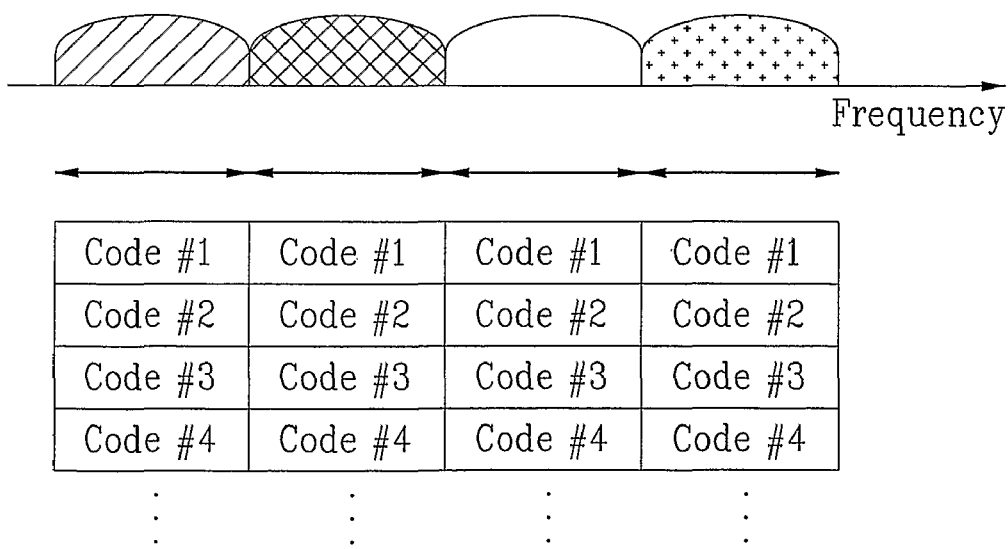

FIG. 4A and FIG. 4B are explanatory views illustrating a method of transmitting pilot signals using a combined multiplexing system of code division multiplexing and frequency division multiplexing. If the combined multiplexing system of code division multiplexing and frequency division multiplexing is used to transmit pilot signals, much more UEs can transmit pilot signals simultaneously. In general, as shown in FIG. 4A and FIG. 4B, codes are used in each of frequency domains divided from the whole transmission band using frequency, so that many UEs can simultaneously transmit pilots in one frequency domain.

Figure 5A:
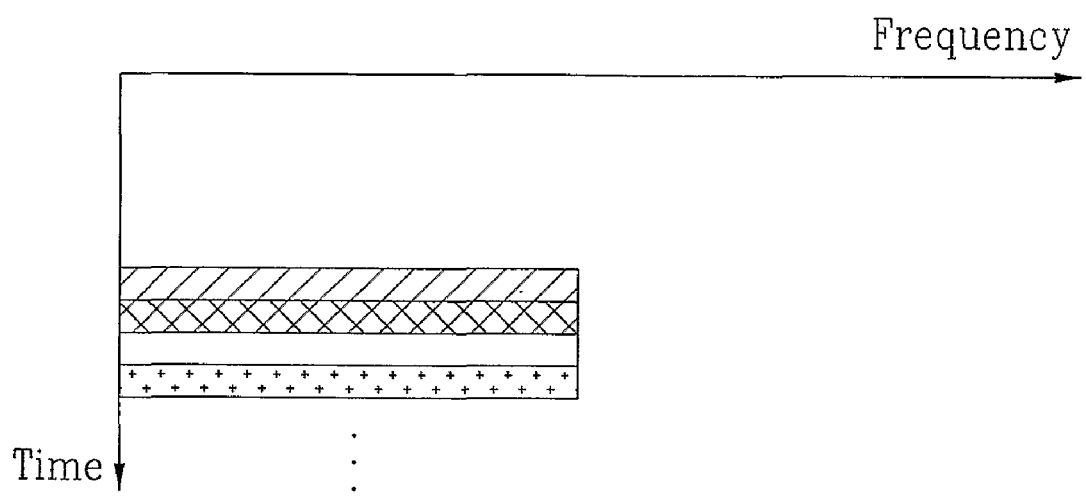
FIG. 5A and FIG. 5B are explanatory views illustrating a method of transmitting pilot signals using time division multiplexing.
Figure 5B:
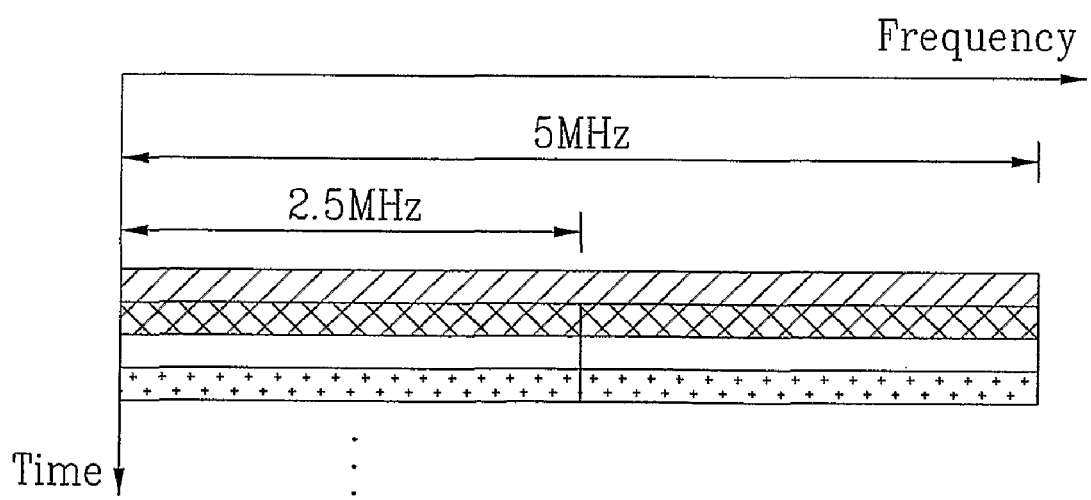

FIG. 5A and FIG. 5B are explanatory views illustrating a method of transmitting pilot signals using time division multiplexing.

According to general time division multiplexing, as shown in FIG. 5A, UEs transmit CQ pilots from one short block SB2 at different times. Meanwhile, for scalable bandwidth, UEs can transmit CQ pilots in the same manner as shown in FIG. 5B, wherein the scalable bandwidth means that communication entities can use different bandwidths. However, if many UEs transmit CQ pilots using time division multiplexing within one sub-frame, a problem related to PAPR may occur.

Accordingly, it is preferable that UEs transmit CQ pilots at different times for the unit of a multiple level of sub-frame. Hereinafter, this method will be referred to as sub-frame level TDM. In this case, the sub-frame level TDM may be combined with the code division multiplexing, the frequency division multiplexing, and the combined multiplexing of the code division multiplexing and the frequency division multiplexing.

The method of transmitting CQ pilots per sub-frame can quickly notify Node B of change in channel property. However, if the length of the sub-frame is sufficiently smaller than channel change, CQ pilots are not transmitted per sub-frame but their transmission period becomes longer, whereby much more UEs can transmit the CQ pilots.

The sub-frame level TDM is to increase the number of UEs which can transmit pilots, and allows each UE not to transmit pilot signals per sub-frame but to transmit pilot signals per given period. In other words, all the UEs receive offset of a start time for transmission of CQ pilot signals and information of a transmission period indicating the sub-frame level required for transmission of the pilot signals from Node B through signaling.

Figure 6A:
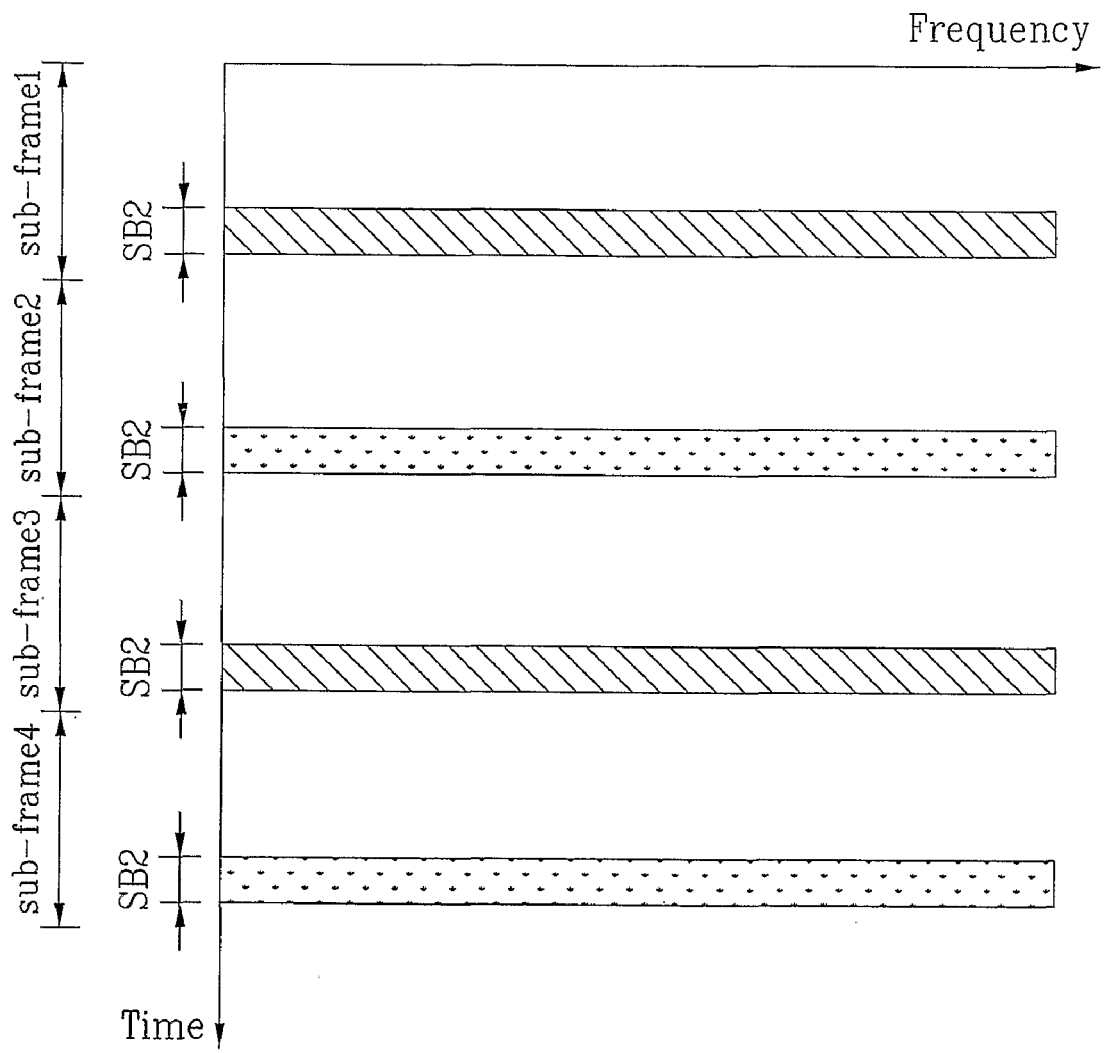
FIG. 6A and FIG. 6b are explanatory views illustrating a sub-frame level time division multiplexing system.
Figure 6B:
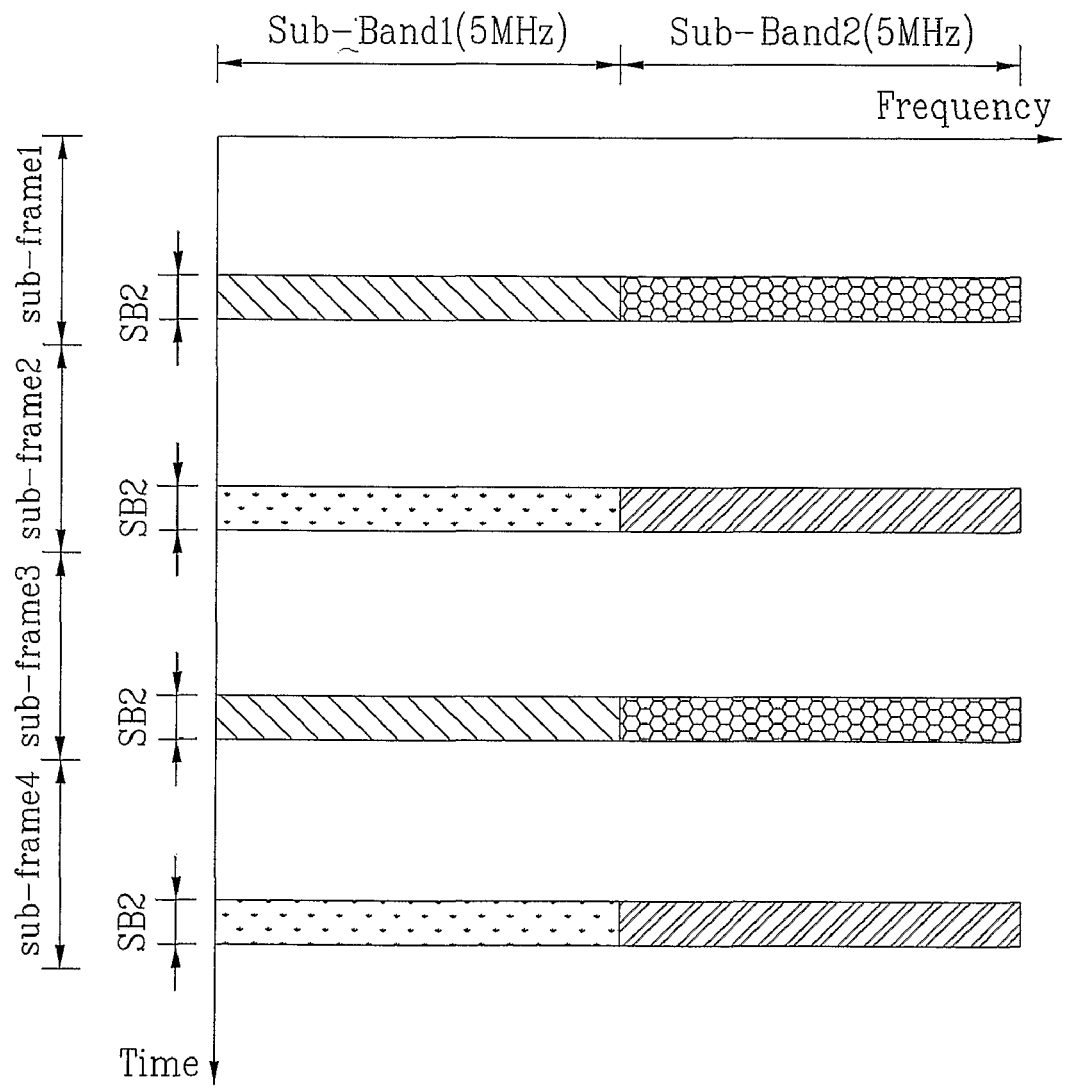

FIG. 6A and FIG. 6b are explanatory views illustrating the sub-frame level time division multiplexing system. FIG. 6A is an example illustrating that CQ pilots are transmitted to SB2. As shown in FIG. 6A, when a transmission period of all the UEs is sub-frame of 2, some UEs have transmission offset of sub-frame of 0, and another UEs have sub-frame of 1, UEs within one cell or sector are divided into UEs which transmit CQ pilots to even numbered sub-frames and UEs which transmit CQ pilots to odd numbered sub-frames.

UEs which transmit pilots from a specific sub-frame should transmit pilot signals by forming orthogonal channels in their sub-frame in frequency division multiplexing, code division multiplexing, or combined multiplexing of the frequency division multiplexing and the code division multiplexing. At this time, a resource actually allocated from a transmission sub-frame to a specific UE is determined by a transmission sub-frame time. In other words, if pilot signals of UEs are multiplexed by frequency division multiplexing within one sub-frame, frequency which each UE uses at its transmission timing is determined by a transmission timing point. Accordingly, a frequency resource which one UE can use may be equal or different per transmission timing point. If the frequency resource is different per transmission timing point, information of the whole frequency band can be identified more exactly.

Meanwhile, if the pilot signals of the UEs are multiplexed by code division multiplexing, either codes which respective UEs use or phase offset of the codes are also determined by a transmission timing point. In this case, a code phase offset value of each UE may be equal or different per transmission timing point. Alternatively, codes which respective UEs use may be equal or different per transmission timing point. If one UE uses either codes having different code phase values per transmission timing point or different codes, interference between the codes can be randomized.

Furthermore, UEs can transmit pilot signals by dividing the whole band into sub-bands without transmitting pilot signals for the whole band at one time during one sub-frame or its corresponding pilot transmission time, due to limited UE transmission power and several factors. In this case, a method of independently reporting transmission offset and transmission period of CQ pilot signals of each UE to UE for each sub-band is suggested. At this time, different sub-bands of one UE may have the same transmission period.

Meanwhile, in the case that UEs transmit pilot signals by dividing the whole band into a plurality of sub-bands without transmitting pilot signals for the whole band at one time during one sub-frame or its corresponding pilot transmission time, a method of allocating different orthogonal codes, for example, CAZAC codes and HADAMARD codes, to each sub-band and transmitting pilot signals from each UE using the orthogonal codes allocated to each sub-band may be considered.

FIG. 6B is an explanatory view illustrating a method of transmitting pilot signals from UEs by dividing a whole band of 10 MHz into two sub-bands of 5 MHz in a system of which whole band is 10 MHz. Considering scalable bandwidth, UEs which can transmit pilot signals at 5 MHz and UEs which can transmit pilot signals at 10 MHz may co-exist within one cell. Also, even though one UE can support 10 MHz depending on its power and traffic, the UE may not transmit pilot signals at 10 MHz. As shown in FIG. 6B, transmission offset and transmission period of the pilot signals are varied depending on each sub-band by sub-frame level time division of pilot signals.

UE of 10 MHz can transmit pilot signals by dividing the whole band into sub-bands of 5 MHz during one sub-frame without transmitting the pilot signals for the whole band of 10 MHz during one sub-frame. Also, timing offset is equally given to the UE of 10 MHz for two bands of 5 MHz, so that the UE can transmit CQ pilots corresponding to 10 MHz during the same sub-frame. In this way, although each UE independently transmits CQ pilots to each sub-band, since Node B can identify channel information of the whole band of 10 MHz, both frequency scheduling of each sub-band level (5 MHz in case of the example of FIG. 6B) and frequency scheduling of the whole band (10 MHz in case of the example of FIG. 6B) can be performed.

Meanwhile, in the case that second pilots for channel estimation during data transmission should be transmitted, a method of transmitting pilot signals will be described below. As described above, examples of pilots include CQ pilots and data pilots. When the UE transmit data, for more exact channel estimation, the UE may additionally transmit pilots.

In other words, in the method of transmitting data pilots to SB1 and transmitting data pilots and CQ pilots to SB2 and the method of transmitting data pilots and CQ pilots to SB1 and transmitting data pilots to SB2, data pilots are transmitted to one short block and data pilots and CQ pilots are together transmitted to SB2.

For example, in the method of transmitting data pilots only to SB1 and transmitting data pilots and CQ pilots to SB2, it is assumed that the data pilots transmitted to SB1 are referred to as first pilots and the data pilots transmitted to SB2 are referred to as second pilots. In this case, if UE for data transmission transmits CQ pilots, the CQ pilots may be replaced with the second pilots. Alternatively, if the UE for data transmission does not transmit CQ pilots, the second data pilots may be additionally be transmitted.

Meanwhile, in the case that UE transmits data and CQ pilots within one sub-frame, a method of transmitting pilot signals will be described below. If UE transmits both data and CQ pilots within one sub-frame, a method of transmitting second pilots is suggested. The second pilots may be transmitted by multiplexing with the CQ pilots. Alternatively, the UE may use the CQ pilots as the second pilots without transmitting the second pilots.

Figure 7A:
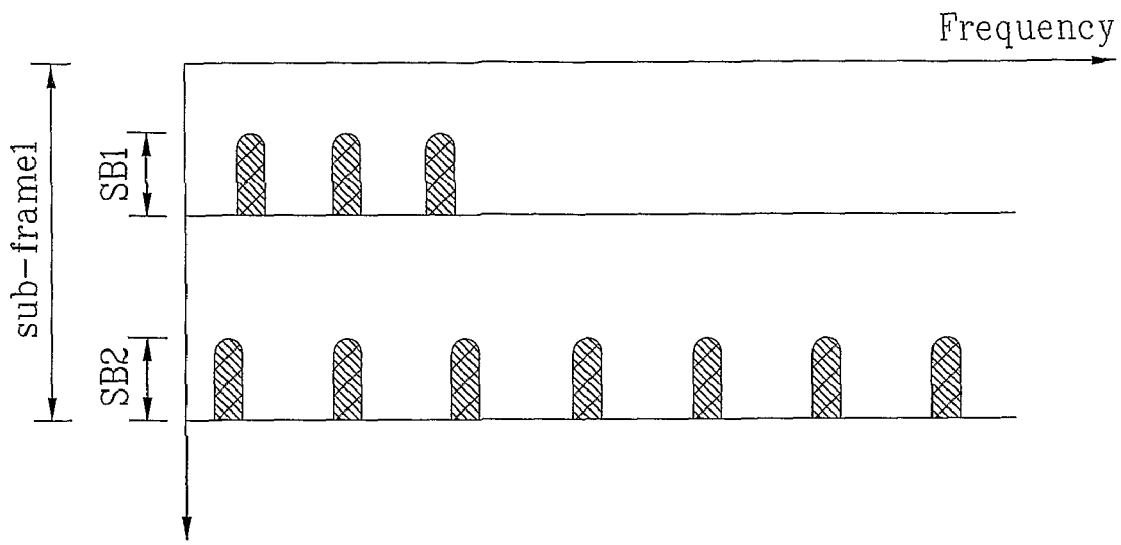
FIG. 7A and FIG. 7B are explanatory views illustrating a method of transmitting second pilots when a UE simultaneously transmits data and CQ pilots within one sub-frame.
Figure 7B:
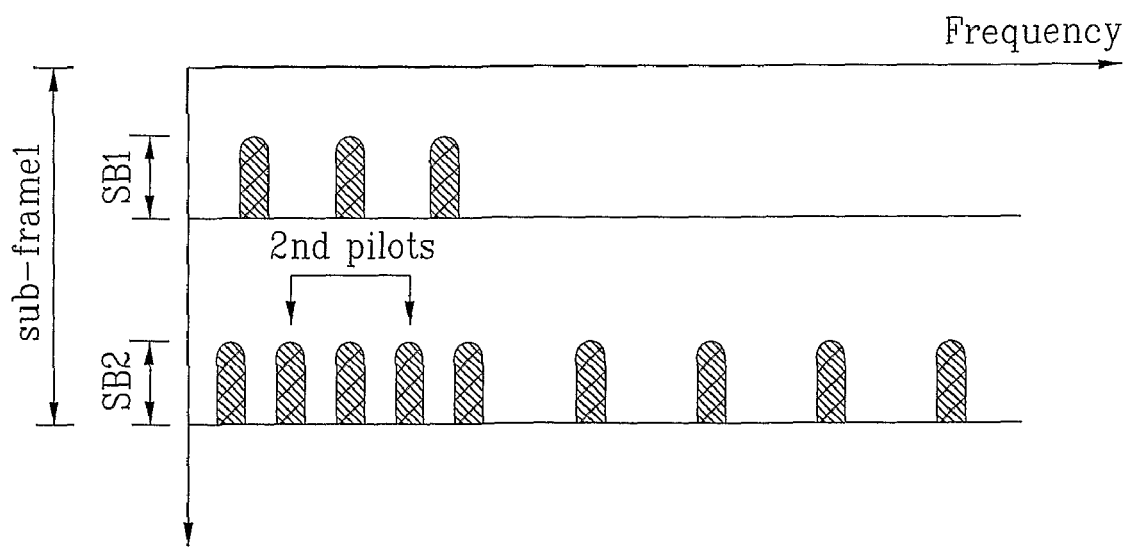
Figure 7B:

FIG. 7A and FIG. 7B are explanatory views illustrating a method of transmitting second pilots when UE simultaneously transmits data and CQ pilots within one sub-frame. In the case that the UE transmits CQ pilots to SB2 and transmits data pilots to SB1, UE which transmits pilots to SB1 means UE which transmits data from a corresponding sub-frame. UE0 transmits data from a corresponding sub-frame and also transmits CQ pilots. Referring to FIG. 7A, UE0 does not transmit additional second pilots and uses CQ pilots as second pilots. Referring to FIG. 7B, UE0 additionally transmits second pilots. At this time, the second pilots are multiplexed with the CQ pilots and then transmitted.

In the case that the second pilots are multiplexed with the CQ pilots in one SB and transmitted, one of the CQ pilot channels is reserved and allocated for transmission of the second pilots. For example, four CQ pilot channels are shown in FIG. 3D, wherein one of the four CQ pilot channels is reserved for the second pilots and multiplexed with the CQ pilots. In the case that both data pilots and CQ pilots should be transmitted to SB1 and SB2, respectively, a resource for data pilots may be reserved as above.

The second pilots may be transmitted by being multiplexed with CQ pilots by various methods such as time division, frequency division, code division, or their combination. The second pilots have a resource allocated thereto smaller than that of the first pilots. The method of multiplexing the second pilots with the CQ pilots may be used even in the case that the CQ pilots are transmitted to SB1, the data pilots are transmitted to SB2, and the CQ pilots and the data pilots are transmitted to SB1 and SB2.

Figure 8:
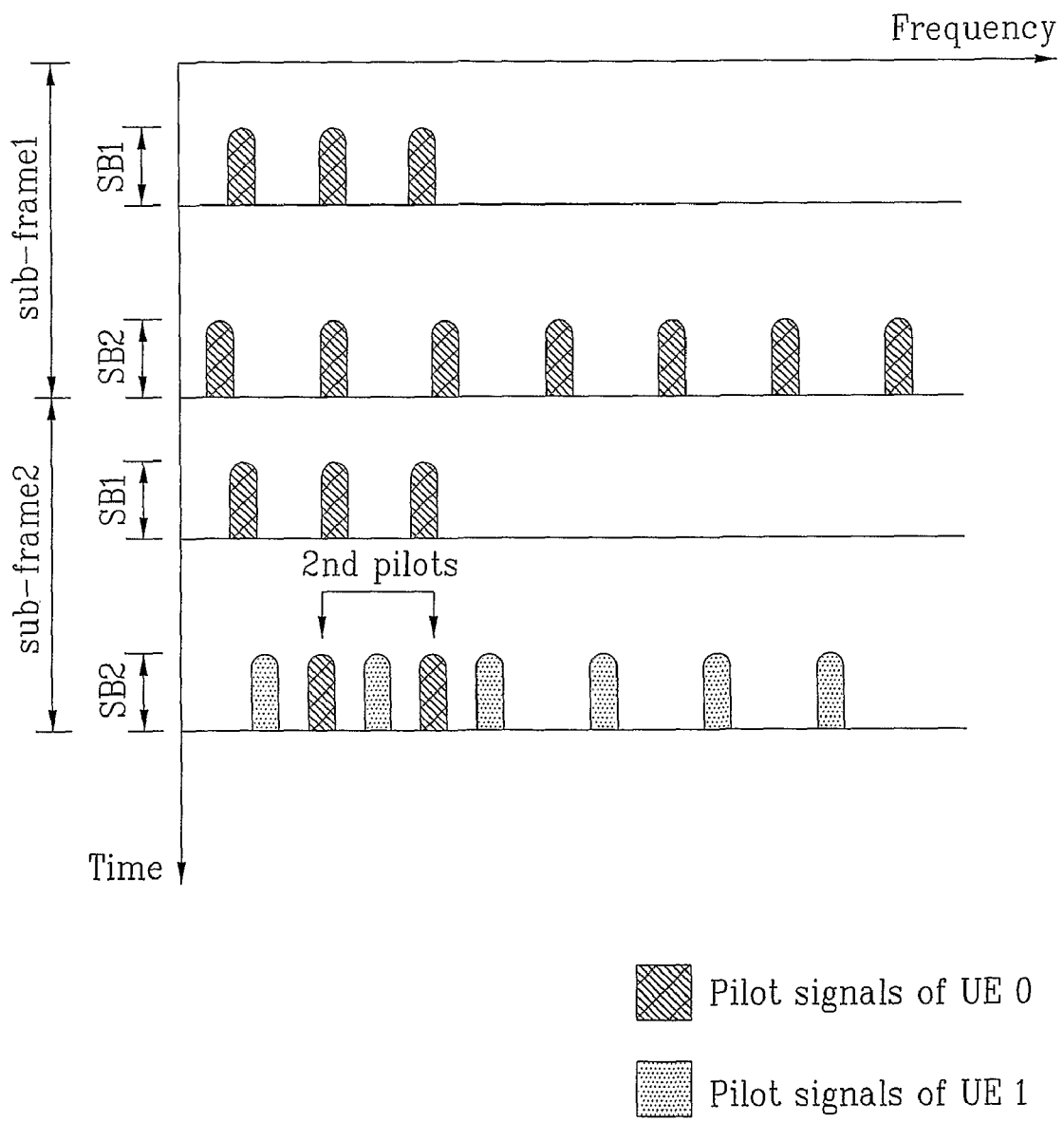
FIG. 8 is an explanatory views illustrating a method of transmitting second pilots for channel estimation when a UE transmits data at a timing period when it does not transmit CQ pilots in the case that the second pilots should be transmitted during data transmission and the UE transmits the CQ pilots in time division multiplexing.

FIG. 8 is an explanatory views illustrating a method of transmitting second pilots for channel estimation when a UE transmits data at a timing period when it does not transmit CQ pilots in the case that the second pilots should be transmitted during data transmission and the UE transmits the CQ pilots in time division multiplexing.

As described above, in the case that the sub-frame level time division multiplexing is used, the UE does not transmit CQ pilots per sub-frame. At this time, in the case that the UE transmits data in a sub-frame which the UE does not transmit CQ pilots, a method of transmitting second pilots will be described below. In other words, as shown in FIG. 8, UE0 transmits data during sub-frames 1 and 2, and transmits CQ pilots during sub-frame 1 only. FIG. 8 illustrates an example where CQ pilots are transmitted to SB2 and data pilots are transmitted to SB1. A method of using CQ pilots as second pilots during sub-frame 1 where CQ pilots are transmitted and transmitting second pilots during sub-frame 2 where CQ pilots are not transmitted is suggested. At this time, the second pilots and the CQ pilots may be multiplexed by code division multiplexing, frequency division multiplexing, time division multiplexing, and combined multiplexing of code division multiplexing and frequency division multiplexing. Also, this method may be used even in the case that the CQ pilots are transmitted to SB1, the data pilots are transmitted to SB2, or the CQ pilots and the data pilots are transmitted to SB1 and SB2. In the present invention, since many UEs can transmit CQ pilots, exact channel estimation can be performed and thus communication efficiency can be improved.

Although terminologies used herein have the same meaning, they may be used as different terms. For example, pilots may be replaced with reference signals or symbols or training signals or symbols.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a system which transmits data using multiple carriers, for example, an OFDM system, a DFT-S-OFDM system, and an OFDMA system.

What is claimed is:
1. A method for a user equipment (UE) to transmit two types of pilot signals to a base station, the method comprising:
transmitting, by the user equipment, a first type pilot signal for channel quality measurement to the base station through a subband in a frequency region corresponding to a given subband information at a subframe corresponding to a given subframe unit transmission period and a given subframe unit offset value; and transmitting a second type pilot signal for a data demodulation to the base station at a subframe where the UE transmit data, wherein the first type pilot signal is transmitted at a first symbol and the second type pilot signal is transmitted at a second symbol other than the first symbol within a specific subframe where the UE transmits both the first and the second pilot signals.

2. The method of claim 1, wherein transmit powers for the first and the second pilot signals are independently determined.

3. The method of claim 1, wherein the given subframe unit transmission period and the given subframe unit offset value are received from the base station.

4. The method of claim 3, wherein the given subband information is received from the base station.

5. The method of claim 1, wherein a position of the subband in the frequency region for transmitting the first type pilot signal is independently determined for each subframe.

6. The method of claim 1, wherein a size of the subband in the frequency region for transmitting the first type pilot signal is determined considering a size of a transmission bandwidth.

7. The method of claim 1, wherein, when another user equipment transmits the first type pilot signal at the subframe where the user equipment transmits the first type pilot signal, the first type pilot signal of the user equipment and the first type pilot signal of the another user equipment are frequency divisional multiplexed such that the first type pilot signal of the user equipment and the first type pilot signal of the another user equipment are transmitted through different subbands in the frequency region within the subframe.

* * * * *

UNITED STATES PATENT AND TRADEMARK OFFICE
CERTIFICATE OF CORRECTION

| | | |
|---|---|---|
| PATENT NO. | : 7,855,947 B2 | Page 1 of 1 |
| APPLICATION NO. | : 12/509307 | |
| DATED | : December 21, 2010 | |
| INVENTOR(S) | : Young Woo Yun et al. | |

It is certified that error appears in the above-identified patent and that said Letters Patent is hereby corrected as shown below:

In claim 2, column 11, line 10, change "second pilot signals" to --second type pilot signals--.

Signed and Sealed this
Thirteenth Day of September, 2011

David J. Kappos
*Director of the United States Patent and Trademark Office*